United States Patent [19]

Smith

[11] 4,400,117
[45] Aug. 23, 1983

[54] INSERT TYPE MILLING CUTTER

[75] Inventor: Theo J. Smith, Grosse Pointe Farms, Mich.

[73] Assignee: Milling Specialties, Inc., Warren, Mich.

[21] Appl. No.: 260,642

[22] Filed: May 4, 1981

[51] Int. Cl.³ .............................................. B23C 5/22
[52] U.S. Cl. ..................................... 407/49; 407/113; 83/698
[58] Field of Search ...................... 407/49, 41, 55, 113, 407/114; 83/698, 674

[56] References Cited

U.S. PATENT DOCUMENTS

| | | | |
|---|---|---|---|
| 1,089,527 | 3/1914 | Bolton | 407/41 |
| 1,538,929 | 5/1925 | DeVlieg | 407/49 X |
| 1,664,083 | 3/1928 | Miller | 407/49 X |
| 1,714,036 | 5/1929 | Miller | 407/41 X |
| 1,747,455 | 2/1930 | Miller | 407/41 X |
| 2,645,003 | 7/1953 | Thompson et al. | 407/49 X |
| 2,684,520 | 7/1954 | Severson | 407/49 X |
| 3,374,700 | 3/1968 | Mages | 83/674 |
| 3,574,911 | 4/1971 | Penoyar | 407/114 |
| 3,887,975 | 6/1975 | Sorice et al. | 407/113 X |
| 4,303,113 | 12/1981 | Andersson | 407/49 X |

FOREIGN PATENT DOCUMENTS 1284435  8/1972  United Kingdom .

*Primary Examiner*—Frank T. Yost
*Attorney, Agent, or Firm*—Stephenson and Boller

[57] ABSTRACT

A rotary milling cutter has a body with one or more insert seats on the body. A cutting insert is disposed in each seat and is locked in place by means of a pair of fasteners which are threaded into corresponding tapped holes in the cutter body adjacent the seat. Each insert contains a pair of spaced grooves on a surface of the insert adjacent the fastener. The axis of each fastener is disposed in the same plane as and at an acute angle to the axis of a corresponding groove. As each fastener is advanced into its threaded hole, a circular edge of the head of the fastener lodges in the corresponding groove exerting a locking force to lock the insert in place in its seat. The grooves have elliptically contoured cross sections conforming to the elliptical projections of the circular edges of the fastener heads when viewed axially of the grooves. There is also a counterbore at the near end of each threaded hole for receiving the head of the corresponding fastener.

12 Claims, 6 Drawing Figures

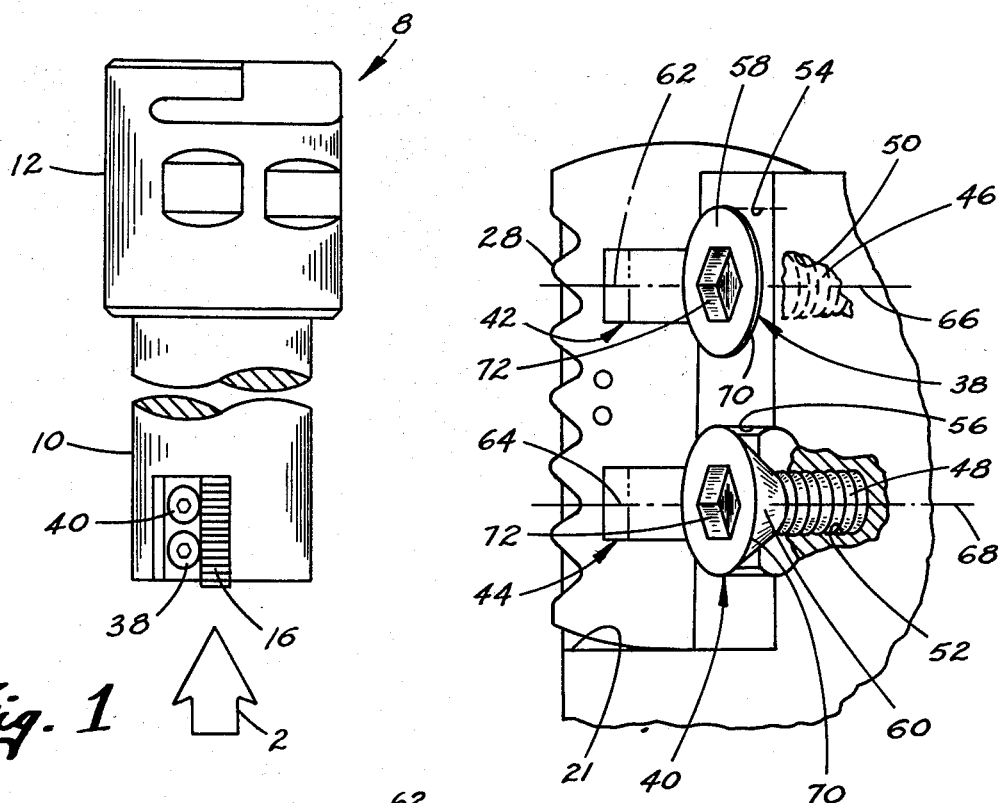
Fig. 1
Fig. 3
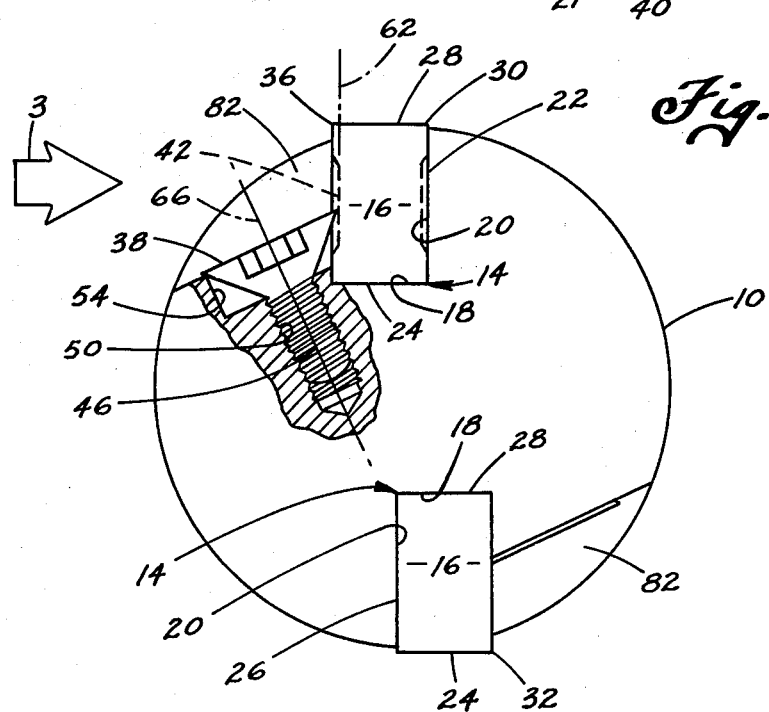
Fig. 2

INSERT TYPE MILLING CUTTER

BACKGROUND AND SUMMARY OF THE INVENTION

The present invention relates generally to rotary milling cutters and is more specifically concerned with a new and improved arrangement for locking cutting inserts on a cutter body.

Insert type milling cutters have achieved considerable popularity in the metal working field. Typically the inserts are made of a very hard cutting material such as tungsten carbide. A milling cutter and insert construction which has greatly enhanced the metal removing capability of insert type cutters is disclosed in the commonly assigned U.S. Pat. No. 3,574,911, dated Apr. 13, 1971. In that patent are disclosed tungsten carbide inserts having sinusoidal serrations forming the cutting edges. The inserts are arranged at locations around the circumference of the cutter body with the sinusoidal cutting edges of each insert being phased relative to those of the other inserts so that the milling cutter accomplishes a phased cutting action.

It has been observed that phased sinusoidal cutting inserts may, in certain situations, create drag on a workpiece being machined which may be greater than that of other types of milling cutters, such as plainsided inserts. For example, it has been observed in certain instances that the serrated sinusoidal cutting edges drag in the serrated sinusoidal form left on the sidewall of the workpiece being machined. The resultant forces which are generated by such dragging attempt to dislodge the insert from its seat on the cutter body. If an insert is moved or dislodged from its correct position, the phased cutting action of this type milling cutter is impaired. Once the phasing is interrupted, the problem is compounded. The dragging effect increases with the result that other inserts in the cutter body will be more likely to line themselves up with the phase of the preceeding insert thereby impairing the effectiveness of cutting action. Attention to cutter geometries can alleviate the problem, but may not eliminate it for all cutting conditions. While the aforementioned patent discloses inserts having triangular shapes, it will be appreciated that other insert shapes may be used in phased multi-insert cutters; for example, a rectangular shaped insert is a known type of insert.

Hence, when sinusoidal cutting inserts are used, care must be taken to mount them in such a way as to maintain them in the desired locations on the cutter body in spite of the increased drag forces which may be applied to them tending to move or to dislodge them from their seats on the cutter body.

The present invention is directed to a new and improved mounting arrangement for mounting cutting inserts on the body of a milling cutter. With the invention, a more secure mounting of cutting inserts on a cutter body is achieved. This allows the inserts to withstand drag forces to which they may be subjected when in use, without being shifted in or dislodged from their seats. A particular advantage of the invention is that movement of an insert axially along the direction of its cutting edge is eliminated. This is especially important in phased multi-insert cutters, for it means that the phasing action will not be impaired due to movement of the inserts axially on the cutter body. Not only is an improved mounting achieved with the invention, but also the inserts may be expediently removed and installed when it is desired to change the cutting edges. Still another advantage of the invention is that it takes up a relatively small amount of space and hence allows very close spacing between inserts on a cutter body. The invention also allows a variety of different shaped inserts to be mechanically held on a cutter body. While the invention is especially beneficial for phased sinusoidal insert cutters, its principles may be used with other types of inserts. Still another advantage of the invention is that the inherent strength of the cutter body is not significantly impaired when the insert mounting arrangement is incorporated.

Briefly, the invention provides a mounting arrangement for milling cutter inserts wherein a pair of axially spaced grooves are provided in an exposed surface of the insert. A pair of threaded holes are provided in the cutter body adjacent to the grooves. A fastener is threaded into each threaded hole and advanced so that the circular edge of the head of the fastener engages the corresponding groove in a wedging manner. The insert is thereby locked in the seat very securely, and the possibility of axial movement is virtually eliminated when the cutter is put to use. The axis of each fastener is disposed in the same plane as and at an acute angle to the axis of the corresponding groove. Each groove has an elliptical transverse cross section corresponding to the elliptical projection of the corresponding fastener head when viewed axially of the groove.

The foregoing features, advantages and benefits of the invention, along with additional ones, will be seen in the ensuing description and claims which should be considered in conjunction with the accompanying drawings.

The drawings disclose a preferred embodiment of the invention according to the best mode contemplated at the present time for carrying out the invention.

BRIEF DESCRIPTION OF THE DRAWINGS

FIG. 1 is a longitudinal plan view, having a portion removed, of a milling cutter embodying principles of the present invention.

FIG. 2 is an enlarged end view of the milling cutter of FIG. 1, having a portion broken away, and taken in the direction of arrow 2 in FIG. 1.

FIG. 3 is a fragmentary side view taken in the direction of arrow 3 in FIG. 2, and turned 90°.

DESCRIPTION OF THE PREFERRED EMBODIMENT

Figure 4:
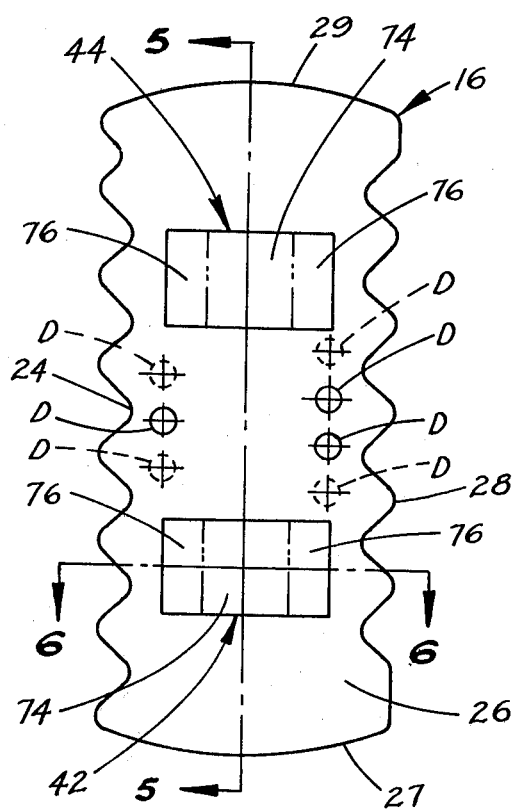
FIG. 4 is an enlarged side view of one of the cutter inserts shown by itself.

The drawings show an insert type milling cutter 8 having a generally cylindrical cutter body 10 including a shank 12 via which the cutter may be mounted on the spindle of a milling machine.

The illustrated cutter is shown to have two insert seats 14 arranged 180° apart around the circumference of the cutter body. Disposed within each seat 14 is a cutting insert 16 having a generally rectangular shape. Each seat comprises a bottom wall 18 and a side wall 20 which are arranged at right angles to each other and which extend lengthwise of the cutter. Each seat is open at the distal end of the cutter body but terminates axially at an end wall 21.

Figure 6:
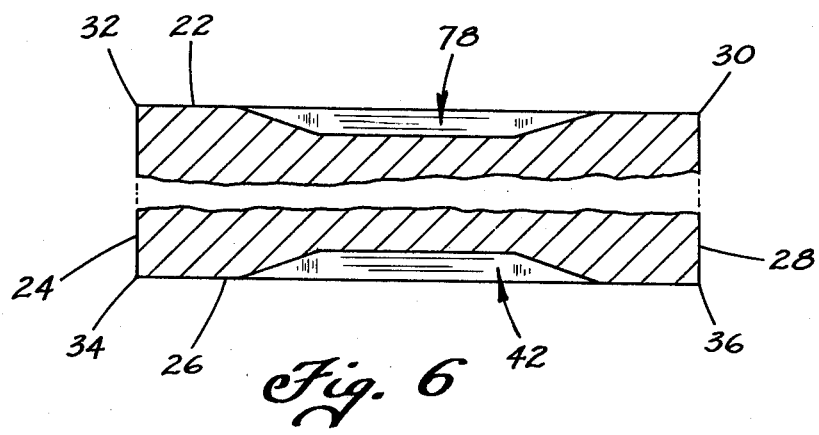
FIG. 6 is an enlarged sectional view taken in the direction of arrows 6—6 in FIG. 4.

Each insert has four sides designated, as seen in FIG. 6, by the reference numerals 22, 24, 26, and 28 respectively. For the upper insert in FIG. 2, the sides 22 and 24 are shown in the drawings as disposed against the walls 20 and 18 respectively of the corresponding seat 14 while the sides 26 and 28 are exposed. The two opposite sides 22 and 26 are generally flat while the other two opposite sides 24 and 28 are sinusoidal serrations. The respective intersections of the sinusoidally serrated sides 24, 28 with the other sides 22, 26 define four axially extending cutting edges of sinusoidal contour 30, 32, 34 and 36. The edges at the ends 27, 29 can also cut. In the illustrated cutter only one serrated cutting edge of each insert is in use at a given time, and hence for the upper insert as viewed in FIG. 2 it is the edge 36 which performs the cutting action when the cutter is in use.

The arrangement for releasably locking this particular insert in its seat includes a pair of fasteners 38, 40, which in the disclosed embodiment are headed screws. The arrangement further includes an associated pair of grooves 42, 44 in side 26 of the insert. The shanks 46, 48 of the screws are threaded into corresponding threaded holes 50, 52 in the cutter body adjacent the insert seat. Counterbores 54, 56 are provided at the near end of each hole 50, 52, respectively, to receive the heads 58, 60 of the respective screws. Each groove may be considered as having a corresponding axis 62, 64 which extends lengthwise of the groove, and is perpendicular to the length of the insert. The axis 62, 64 of each groove is also disposed in the same plane as the axis 66, 68 of the corresponding screw and its hole.

The head of each screw is of generally frustoconical shape, and has an outer edge 70 which is circular in shape when viewed axially of the screw. A polygonal socket 72 is provided in the top of each head for engagement by a similarly shaped drive for tightening and untightening the screw in its hole.

Figure 5:
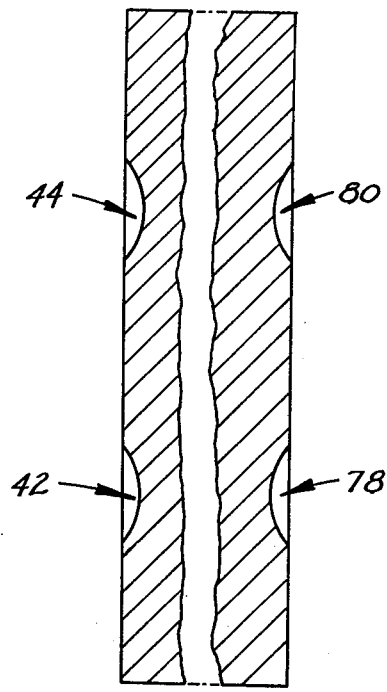
FIG. 5 is an enlarged sectional view taken in the direction of arrows 5—5 in FIG. 4.

In FIGS. 4, 5 and 6 it can be seen that each groove 42, 44 comprises a main section 74 of uniform cross section and end sections 76 at the opposite ends of main section 74. The main section 74 has a transverse cross section of concave contour corresponding to a portion of an ellipse. The end sections 76 merge the concave elliptical contour of section 74 into the otherwise flat surface of side 26.

When the shape of the circular outer edge 70 of each screw head is viewed in the direction of FIG. 1, it can be seen that the circular edge projects into an ellipse. The contour of each groove section 74 is shaped to correspond in complement to the segment of the ellipse of the screw head which, as viewed in FIG. 1, directly faces the insert. Hence, as the screws are advanced into their respective holes, the segment of each head facing the insert lodges congruently in the corresponding insert groove, and as the screws are tightened, a locking force is exerted on the insert, locking it in the seat. It will be noted that the force is exerted at axially spaced locations along the length of the insert because the screws are axially spaced. In addition to the action of wedging the insert in its seat, the edge portions 70 of the screw heads which fit within the grooves 42, 44 serve to lock the insert axially with an interference fit. Hence, a very secure and accurate mounting of the insert on the cutter body is achieved.

It will be observed that the axes 62, 64 of the respective grooves are located axially of the insert in a predetermined relationship to the phase of the serrated side 28. For example, axis 64 is at the trough of one of the sinusoidal serrations of side 28. Hence when the insert is placed on the seat and locked in place by means of the screws, not only is the insert axially located, but also the phase of the active cutting edge 36 is established. Other inserts and mountings may be arranged and constructed so that their phasing is in the desired relative relationship.

In the disclosed embodiment having the two inserts 180° apart, the phasing action of the active cutting edges of the respective inserts should also be 180° apart. The illustrated insert design can be used in either location. It will be observed that the serrated surface 24 has its serrations 180° out of phase relative to the serrations on the opposite surface 28. Hence, the surface 24 faces radially outwardly on the lower insert in FIG. 2, while the surface 28 faces radially outwardly on the opposite insert. Two grooves 78 and 80 are provided in side 22 and are arranged to bear the same relationship to the phase of the serrations of side 28 as the set of grooves 42, 44. For the lower insert of FIG. 2, the insert sides 26, 28 respectively bear against walls 20, 18 respectively of the seat and the edge 32 is the active cutting edge. That edge 32 is 180° out of phase relative to the edge 36 of the opposite insert. The two holes 50 are at the same axial location on the cutter body, and so are the two holes 52. The two pairs of grooves 42, 44 and 78, 80, respectively are symmetrically located lengthwise of the insert, and each groove is equidistant from the adjacent end 27, 29. Hence a common insert can be used in the illustrated cutter thereby minimizing tooling and inventory requirements. A further advantage of the illustrated inserts is that when one of the cutting edges becomes dull, say for example the cutting edge 36 of the upper insert of FIG. 2, the insert may be unlocked and turned in the seat so that the cutting edge 30 becomes active. When the cutting edge 30 of this insert becomes the active one, it is the second set of grooves 78, 80 which are engaged by the screw heads when the insert is again locked in place. Because of the symmetry, the insert is correctly located and phased. A similar procedure may be utilized in connection with the other insert. By appropriate reversal of the inserts, all four serrated edges of each insert may be used before the inserts are replaced. Appropriate indicia are marked on the insert to uniquely identify each cutting edge. The example uses individual dots D adjacent each serrated edge, one to four in number. The odd numbered (not dot, three dots) edges are 34 and 32 while the even numbered edges (two dots, four dots) are 36 and 30. Thus in the cutter of the drawings where one of the active serrated cutting edges is identified by an odd number of dots, the active edge of the opposite insert should be an even number of dots.

A further advantage of the illustrated embodiment is that the counterbores 54, 56 are dimensioned to conform very closely to the diameter across the outer edge 70 of each screw head. By allowing the edge of the screw head to contact the edge of the counterbore, backup support to the screw is provided. Accordingly, the dimensions involved must be carefully chosen so that both proper locking of the insert in its seat and such back-up support for the screw head are concurrently obtained. Accuracy and improved retention are also obtained with the illustrated arrangement because it is possible to hold very close tolerances in the machining of the tapped holes and counterbores in the cutter body and to manufacture the screws and inserts to very close tolerances. In this way good positioning accuracies of the insert in the cutter body is obtained. Hence coupled with the wedging action of the screws on the insert, the screw heads function to position the insert in the correct, axial location. The two grooves on each side of the insert slightly increase the tolerance with respect to the positioning of the cutter insert on the cutter only. A way to alleviate any slight inaccuracy is by making the head of the screw of a material which is not as hard as the material of the insert so that there is a swaging effect on the screw head when the screw is tightened.

By utilizing two axially spaced screws and corresponding grooves there is a lower total force acting on each screw, and hence smaller diameter screws can be used with consequent saving of space and avoidance of interference with chip flow from a workpiece being machined. This is especially advantageous when a large number of cutting teeth are required in a given area; for example, with an automotive face mill, or alternatively with an end mill with extended length of indexable insert side cuts, or small turning or boring tools. While the mounting arrangement is particularly useful with sinusoidal cutting inserts wherein phasing between individual inserts is important, it will be appreciated that the principles of the invention are not limited to this particular type of insert. It will also be observed that a smaller amount of material has to be machined from the cutter body in order to incorporate the insert mounting arrangement. This means that a greater amount of material remains on the cutter body thereby maintaining strength and rigidity in the cutter body itself which is highly desirable.

In addition to the provision of each seat and the corresponding holes and counterbores there is only an additional relief area 82 adjacent each seat which provides for access to the screws and for insertion and removal of inserts to and from the cutter body.

From the foregoing description it can be seen that a new and improved milling cutter with an arrangement for removably locking cutter inserts on the cutter body has been disclosed. While a preferred embodiment has been shown and described herein, it will be appreciated that principles of the invention may be applied to other embodiments, such as those using intermediate members for engaging the insert grooves or those having different fastening arrangments other than tapped holes and screws. Accordingly, various embodiments are contemplated within the scope of the invention as set forth in the following claims.

I claim:

1. A rotary milling cutter having a body, at least one insert seat on said body, a cutting insert disposed in each such seat, each such insert having a cutting edge spaced from its seat, each insert having a first surface portion disposed against its seat and a second surface portion opposite its first surface portion, and means for releasably locking each insert in its seat comprising a pair of indentations in the second surface portion of each insert and a pair of threaded holes in the cutter body, each of said pair of threaded holes corresponding to a corresponding one of the insert indentations and having its axis disposed at an acute angle relative to the location on the second surface portion of the corresponding insert at which the corresponding indentation is located, and a pair of fasteners each having a threaded shank threaded into a corresponding one of the pair of threaded holes, and means on the end of each fastener exterior of the corresponding hole which, upon threading of the fastener to the hole, engages the corresponding indentation thereby locking the insert in the seat, wherein each such insert has four sides extending lengthwise of the insert with adjacent sides being generally at right angles to each other, said first surface portion of each insert corresponding to two adjacent ones of said four sides and said second surface portion of each insert corresponding to the remaining two of said four sides, said indentations being in one of said remaining two sides and spaced from each other in a direction lengthwise of the insert, said indentations being grooves each of whose length is transverse to the length of the side of the insert which contains said grooves, said grooves being parallel to each other and identical in shape, and wherein each of said grooves has a cross section transverse to its length which is of concave elliptical contour and wherein said means on the corresponding fastener engaging the elliptical contour of each groove comprises an elliptical contour of convex cross section when viewed lengthwise of the groove and corresponding to that of the groove.

2. A cutter as set forth in claim 1 wherein said means on the end of each fastener for engaging the corresponding indentation comprises an edge on the head of the fastener which when viewed lengthwise of the fastener is of circular shape.

3. A cutter as set forth in claim 2 wherein the head of each fastener at said circular edge thereof is of a material softer than the material of the insert at the corresponding indentation.

4. A cutter as set forth in claim 3 including a counterbore in said body at the near end of each threaded hole, the head of the corresponding fastener being disposed within the counterbore.

5. A rotary milling cutter having a body, at least one insert seat on said body, a cutting insert disposed in each such seat, each such insert having a cutting edge spaced from its seat, each such insert having a first surface portion disposed against its seat and a second surface portion opposite its first surface portion, and means for releasably locking each such insert in its seat comprising a groove in the second surface portion of the insert, a threaded hole in the cutter body having its axis disposed in same plane as and at an acute angle relative to the axis of the insert groove, a fastener having a threaded shank threaded into said threaded hole, and means on the fastener exterior of the threaded hole comprising an edge which is circular when viewed axially of said hole and fastener and which is elliptical having a convex elliptically contoured segment facing the groove when viewed axially of the groove, said groove having a transverse cross section with a smooth concave contour complementary and congruent to said convex elliptically contoured segment so that as the fastener is advanced into said hole, said edge congruently fits into and engages with said groove to lock the insert in its seat.

6. A rotary milling cutter as set forth in claim 5 in which said means comprising said edge comprises a head integrally formed and joining with the shank of the fastener.

7. A rotary milling cutter as set forth in claim 6 in which said head has a tapered shape tapering radially outwardly in the direction away from the shank, said edge being provided at the radially outermost point of said head relative to the axis of the fastener.

8. An insert for use with a rotary milling cutter body containing an insert seat on which the insert is adapted to releasably locked by means of fastening means having a threaded shank threaded into a threaded hole in the body, said insert comprising a first surface portion adapted to be seated against the insert seat and a second surface portion opposite said first surface portion, said second surface portion including at least one groove having a concave transverse cross sectional shape whose contour corresponds to a segment of an ellipse and which is adapted to congruently receive the edge of a fastening means which is so disposed that it presents to the groove a convex elliptical contoured segment congruent to the transverse cross section of the groove.

9. An insert as set forth in claim 8 wherein the insert comprises a pair of said grooves spaced parallel with each other.

10. An insert as set forth in claim 9 wherein the insert is of generally rectangular shape having four sides extending lengthwise of the insert with adjacent sides being arranged at generally right angles to each other, one pair of opposite ones of said sides each having sinusoidal serrations defining sinusoidal cutting edges at its intersection with the remaining pair of said sides, one of said remaining pair of sides containing said pair of spaced parallel grooves with said grooves extending perpendicular to the length of the insert.

11. An insert as set forth in claim 10 wherein said pair of grooves are located lengthwise of the insert in a predetermined relationship to the phase of one of the sinusoidal serrations of the insert, and wherein there is also provided an additional pair of grooves on the side of the insert opposite the side containing the first-mentioned pair of grooves which are located in the same phase relationship to the same one of the sinusoidal serrations as are the grooves of the first-mentioned pair.

12. A rotary milling cutter having a body, at least one insert seat on said body, a cutting insert disposed in each such seat, each such insert having a cutting edge spaced from said seat, each insert having a first surface portion disposed against said seat and a second surface portion opposite said first surface portion, and means for releasably locking each insert in its seat comprising a pair of spaced parallel grooves in the second surface portion of the insert, a pair of threaded holes in the cutter body each corresponding to a corresponding one of the insert grooves and each having its axis disposed in the same plane as and at an acute angle relative to the axis of the corresponding insert groove, and a pair of headed screws each having a threaded shank threaded into a corresponding one of the two threaded holes and a circular edge on the head of each screw whose projection is a convex elliptically contoured segment when viewed axially of the corresponding groove, each groove having a concave elliptical contour complementary to the projection of the circular edge of the screw head, the edge of each screw head, upon threading of each screw into its hole, engaging the corresponding groove, thereby locking the insert in the seat.

* * * * *